(12) United States Patent
Cloud et al.

(10) Patent No.: US 12,210,196 B2
(45) Date of Patent: Jan. 28, 2025

(54) COVER FOR A FIBER OPTIC FERRULE AND FERRULE PUSH

(71) Applicant: US Conec, Ltd, Hickory, NC (US)

(72) Inventors: Mitchell Cloud, Hickory, NC (US); Jason Higley, Hickory, NC (US); Darrell R. Childers, Hickory, NC (US)

(73) Assignee: US Conec Ltd., Hickory, NC (US)

( * ) Notice: Subject to any disclaimer, the term of this patent is extended or adjusted under 35 U.S.C. 154(b) by 0 days.

(21) Appl. No.: 17/119,877

(22) Filed: Dec. 11, 2020

(65) Prior Publication Data
US 2021/0181433 A1    Jun. 17, 2021

Related U.S. Application Data

(63) Continuation-in-part of application No. 17/251,076, filed on Dec. 10, 2020, now Pat. No. 11,280,966.

(60) Provisional application No. 62/947,966, filed on Dec. 13, 2019.

(51) Int. Cl.
*G02B 6/38* (2006.01)

(52) U.S. Cl.
CPC ......... *G02B 6/3851* (2013.01); *G02B 6/3882* (2013.01)

(58) Field of Classification Search
CPC ............................... G02B 6/3882; G02B 6/00
USPC .......................................................... 385/78
See application file for complete search history.

(56) References Cited

U.S. PATENT DOCUMENTS

| | | |
|---|---|---|
| 5,734,558 A | 3/1998 | Poplawski et al. |
| 6,019,521 A | 2/2000 | Manning et al. |
| 6,079,881 A | 6/2000 | Roth |
| 6,086,263 A | 7/2000 | Selli et al. |
| 6,224,268 B1 | 5/2001 | Manning et al. |
| 6,454,464 B1 | 9/2002 | Nolan |
| 6,513,989 B1 | 2/2003 | Bleck et al. |
| 7,296,935 B1 | 11/2007 | Childers et al. |
| 7,609,925 B2 | 10/2009 | Gronvall et al. |
| 7,762,726 B2 | 7/2010 | Lu et al. |
| 8,104,973 B2 | 1/2012 | Howard et al. |
| 8,920,043 B2 | 12/2014 | Iwaya et al. |
| 9,057,845 B2 | 6/2015 | Szilagyi et al. |
| 10,215,926 B2 | 2/2019 | Ott |

(Continued)

FOREIGN PATENT DOCUMENTS

| | | | |
|---|---|---|---|
| WO | WO-2017095928 A1 * | 6/2017 | ........... G02B 6/3821 |
| WO | 2018119140 | 6/2018 | |

(Continued)

OTHER PUBLICATIONS

ISR/WO in PCT/US2021/026306 mailed Jul. 30, 2021.
International Search Report and Written Opinion of the Searching Authority, PCT/US2020/051162, KIPO, Mailing Date: Dec. 29, 2020.

*Primary Examiner* — Kaveh C Kianni
(74) *Attorney, Agent, or Firm* — Michael L Leetzow PLLC; Shubhrangshu Sengupta

(57) ABSTRACT

A cover for a fiber optic ferrule and ferrule push includes a sleeve extending lengthwise between opposed front and rear ends and defines a lengthwise-extending opening that opens through the rear end for receiving at least a portion of the fiber optic fiber optic ferrule and the ferrule push. The sleeve also includes a top side and an opposing bottom side, and two side walls extending between the top side and the bottom side and along at least a portion of the sleeve. A receiver is disposed in the top side to receive a projection associated with the ferrule push.

10 Claims, 12 Drawing Sheets

(56) References Cited

U.S. PATENT DOCUMENTS

| | | |
|---|---|---|
| 10,451,830 B2 | 10/2019 | Szumacher et al. |
| 10,670,814 B2 | 6/2020 | Morishima et al. |
| 10,678,012 B1 | 6/2020 | Wu |
| 11,016,250 B2 | 5/2021 | Higley et al. |
| 2001/0026661 A1 | 10/2001 | De et al. |
| 2002/0057870 A1 | 5/2002 | Dean et al. |
| 2003/0012520 A1 | 1/2003 | Rogge et al. |
| 2003/0063867 A1* | 4/2003 | McDonald .......... G02B 6/4465 385/76 |
| 2004/0017983 A1 | 1/2004 | Chen et al. |
| 2005/0213897 A1* | 9/2005 | Palmer ................. G02B 6/3833 385/95 |
| 2006/0045430 A1* | 3/2006 | Theuerkorn ......... G02B 6/4465 385/53 |
| 2006/0088247 A1* | 4/2006 | Tran ..................... G02B 6/3874 385/55 |
| 2006/0193562 A1* | 8/2006 | Theuerkorn ......... G02B 6/3878 385/53 |
| 2006/0204178 A1* | 9/2006 | Theuerkorn ......... G02B 6/3831 385/59 |
| 2007/0025665 A1* | 2/2007 | Dean, Jr. .............. G02B 6/3869 385/59 |
| 2007/0160327 A1* | 7/2007 | Lewallen ............. G02B 6/3885 385/53 |
| 2008/0260333 A1 | 10/2008 | Roth |
| 2008/0273840 A1 | 11/2008 | Lu et al. |
| 2009/0003772 A1 | 1/2009 | Lu et al. |
| 2009/0003793 A1* | 1/2009 | Bell ..................... G02B 6/3887 385/139 |
| 2009/0046981 A1* | 2/2009 | Margolin ............. G02B 6/3825 385/70 |
| 2009/0220227 A1 | 9/2009 | Wong et al. |
| 2010/0266245 A1 | 10/2010 | Sabo |
| 2010/0329613 A1 | 12/2010 | Childers et al. |
| 2013/0022317 A1* | 1/2013 | Norris .................. G02B 6/3885 29/428 |
| 2014/0023326 A1 | 1/2014 | Anderson et al. |
| 2014/0205244 A1 | 7/2014 | Bradley |
| 2015/0355417 A1 | 12/2015 | Takano et al. |
| 2016/0004016 A1* | 1/2016 | Zimmel ............... G02B 6/3887 385/59 |
| 2016/0124150 A1 | 5/2016 | James et al. |
| 2017/0010422 A1 | 1/2017 | Childers et al. |
| 2017/0184800 A1 | 6/2017 | Jong et al. |
| 2017/0192180 A1 | 7/2017 | Andrus et al. |
| 2017/0205588 A1 | 7/2017 | Lee et al. |
| 2018/0003910 A1* | 1/2018 | Menguy ............... G02B 6/3825 |
| 2018/0329150 A1* | 11/2018 | Chang .................. G02B 6/3849 |
| 2018/0348447 A1* | 12/2018 | Nhep ................... G02B 6/3851 |
| 2019/0018201 A1 | 1/2019 | Takano et al. |
| 2019/0064447 A1* | 2/2019 | Chang .................. G02B 6/3825 |
| 2019/0137700 A1 | 5/2019 | Takano et al. |
| 2019/0154930 A1 | 5/2019 | Ho et al. |
| 2019/0250344 A1 | 8/2019 | Takano et al. |
| 2020/0064564 A1 | 2/2020 | Ho et al. |
| 2020/0124805 A1* | 4/2020 | Rosson ................ G02B 6/3831 |
| 2020/0183097 A1* | 6/2020 | Chang .................. G02B 6/3831 |
| 2020/0200977 A1 | 6/2020 | Nguyen et al. |
| 2020/0257056 A1 | 8/2020 | Peltsverger et al. |
| 2020/0278502 A1 | 9/2020 | Baelen |
| 2020/0310049 A1 | 10/2020 | Chang |
| 2020/0333537 A1 | 10/2020 | Gniadek et al. |
| 2021/0080656 A1 | 3/2021 | Fujita et al. |
| 2021/0255407 A1 | 8/2021 | Coan et al. |
| 2021/0325614 A1 | 10/2021 | Childers et al. |
| 2022/0082763 A1 | 3/2022 | Verheyden et al. |

FOREIGN PATENT DOCUMENTS

| | | | |
|---|---|---|---|
| WO | 2018119140 A1 | 6/2018 | |
| WO | 2019010291 | 1/2019 | |
| WO | 2019010291 A1 | 1/2019 | |
| WO | WO-2020048464 A1 * | 3/2020 | .......... G02B 6/3807 |
| WO | 2021055532 A1 | 3/2021 | |

* cited by examiner

COVER FOR A FIBER OPTIC FERRULE AND FERRULE PUSH

REFERENCE TO RELATED CASE

This application claims priority under 35 U.S.C. § 119 (e) to U.S. provisional application No. 62/947,966 filed on Dec. 13, 2019, and is a continuation-in-part of U.S. patent Ser. No. 17/251,076, filed on Dec. 10, 2020, the contents of which are hereby incorporated by reference in their entirety.

BACKGROUND OF THE INVENTION

In a data center environment, the routing of optical fibers between data centers usually requires the connection of thousands of optical fibers to connect one data center building to another. Such connections involve manually fusion splicing several thousands of optical fibers. The splicing is usually the last job before the connection of the data centers is complete. However, manually splicing optical fibers is time consuming and expensive due to the labor costs and equipment needed for the job. Thus, this job becomes the bottleneck for bring the new data centers on-line.

A solution to avoiding the fusion-splicing includes using pre-terminated MT ferrules in a pulling grip (or "pulling sock") attached to a jacketed cable between the two data-center buildings. Such a pulling grip is known in the art. Depending on how many fibers per fiber optic ferrule are present, the number of fiber optic ferrules inside the pulling grip will vary. For example, one pulling grip may accommodate a total of 3456 fibers in 288 fiber optic ferrules (i.e., each ferrule having 12 fibers). These fiber optic ferrules are then pulled out of the pulling grip at a designated spot inside the second data center building. Subsequently, an MT-MPO adapter, such as the one shown in U.S. Pat. No. 7,296,935 owned by the Applicant, may be used to connect an MT ferrule directly to an MPO style connector. One concern with this approach is that a technician/user at the data center will need to handle a bare, terminated fiber optic ferrule. This increases the chances of damage to the ferrule, especially since there are hundreds of such fiber optic ferrules that need to be inserted into MT-MPO adapters.

While the pulling grip is fairly clean, the pre-terminated fiber optic ferrule inside the pulling grip may still be prone to debris or dust as many such parts coexist in a limited space. Debris or dust may then scratch the fibers on the end face and/or cause optical signal attenuation. Further, the pin clamp, the ferrule push and the ferrule may come apart during handling inside the pulling grip. This separation may damage the fiber optic ferrule, the ferrule push, or the optical fibers.

Thus, there is a need for a cover that keeps the faces of the pre-terminated fiber optic ferrule protected and covered within the pulling grip.

SUMMARY OF THE INVENTION

The present invention is directed to a cover for a fiber optic ferrule and ferrule push that includes a sleeve extending lengthwise between opposed front and rear ends, said sleeve defining a lengthwise-extending opening that opens through the rear end for receiving at least a portion of the fiber optic fiber optic ferrule and the ferrule push, the sleeve having a top side and an opposing bottom side, and two side walls extending between the top side and the bottom side and along at least a portion of the sleeve, a cutout in each of the two side walls, the cutout extending from the rear end towards the front end, and a receiver in the top side engaged with the ferrule push.

In some embodiments, the receiver is engaged with a key of the ferrule push.

In some embodiments, the receiver is a depression in a top surface within the lengthwise-extending opening.

In some embodiments, the receiver is a window extending through the top side.

In other embodiments, the receiver has a forward facing surface to engage a rearward facing surface on the key.

In some embodiments, the fiber optic ferrule and the ferrule push maintain a spatial relationship within the lengthwise-extending opening of the sleeve.

In yet another aspect, there is a fiber optic assembly that includes a ferrule push, a fiber optic ferrule positioned forward of the ferrule push within a pulling sock having a plurality of optical fibers supported by the ferrule, and a cover coupled to the fiber optic ferrule and the ferrule push and including a sleeve extending lengthwise between opposed front and rear ends, the sleeve defining a lengthwise-extending opening that opens through the rear end for receiving at least a portion of the fiber optic fiber optic ferrule and the ferrule push, the sleeve having a top side and an opposing bottom side, and two side walls extending between the top side and the bottom side and along at least a portion of the sleeve, wherein the fiber optic ferrule and the ferrule push are held together inside the pulling sock by the cover.

And in yet another aspect, there is a cover for a fiber optic ferrule and ferrule push that includes a sleeve extending lengthwise between opposed front and rear ends, said sleeve defining a lengthwise-extending opening that opens through the rear end for receiving at least a portion of the fiber optic fiber optic ferrule and the ferrule push, the sleeve having a top side and an opposing bottom side, and two side walls extending between the top side and the bottom side and along at least a portion of the sleeve, and a receiver in the top side to receive a projection associated with the ferrule push.

It is to be understood that both the foregoing general description and the following detailed description of the present embodiments of the invention are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and, together with the description, serve to explain the principles and operations of the invention.

DETAILED DESCRIPTION OF THE INVENTION

Figure 1:
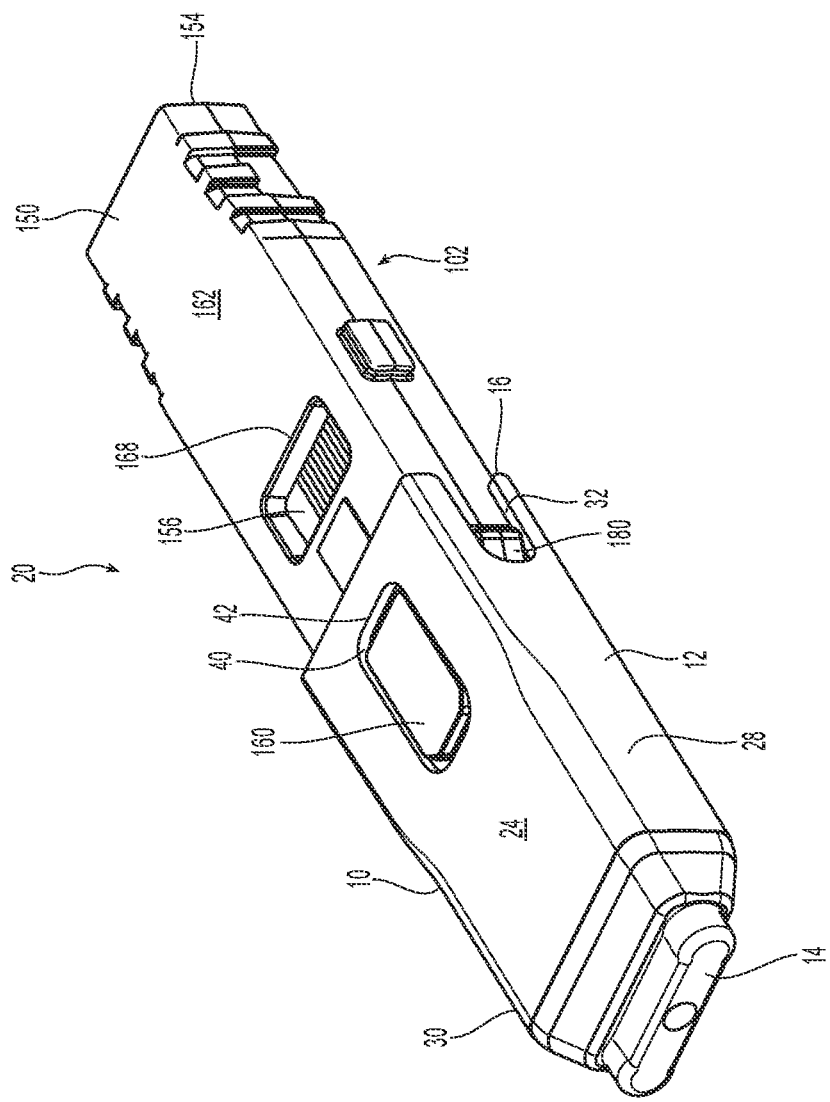
FIG. 1 is a perspective view of one embodiment of a fiber optic assembly that includes a cover for a fiber optic ferrule and ferrule push according to the present invention.

Reference will now be made in detail to the present preferred embodiment(s) of the invention, examples of which are illustrated in the accompanying drawings. Whenever possible, the same reference numerals will be used throughout the drawings to refer to the same or like parts.

Applicant notes that the term "front" or "forward" means that direction where the fiber optic connector and/or the ferrule would meet with another fiber optic connector or device, while the term "rear" or "rearward" is used to mean the direction from which the optical fibers enter into the fiber-optic ferrule, the fiber optic connector, or the ferrule push. Each of the components will therefore have a front and rear, and the two fronts or forward portions of the fiber optic ferrules would engage one another. Thus, in FIG. 1, the "front" of the fiber optic assembly is on the left side of FIG. 1 and "forward" is to the left and out of the page. "Rearward" or "rear" is that part of the fiber optic connector or cover that is on the right side of the page and "rearward" and "backward" is toward the right and into the page.

One embodiment of a fiber optic assembly that includes a cover 10 for a fiber optic ferrule and ferrule push is illustrated in FIGS. 1-2, 4-6, and 8-9. The cover 10 has a sleeve 12 that extends lengthwise between a front end 14 and a rear end 16. The sleeve 12 has a lengthwise-extending opening 18 that opens through the rear end 16 of the sleeve 12 for receiving at least a portion of a fiber optic ferrule and the ferrule push, described below. The combination of the cover 10 and the fiber optic ferrule and the ferrule push may be known as a fiber optic assembly 20. The sleeve 12 has a top side 24 and an opposing bottom side 26. Extending between the top side 24 and the opposing bottom side 26 are two side walls 28,30. The side walls 28,30 extend along at least a portion of the sleeve 12. While the side walls 28, 30 are illustrated as being the same length, they could have different lengths, may not reach all of the way to the front end 14 or the rear end 16. As illustrated there may be a cutout 32 in each of the two side walls 28, 30, the cutouts 32 preferably extending from the rear end 16 towards the front end 14.

Figure 10:
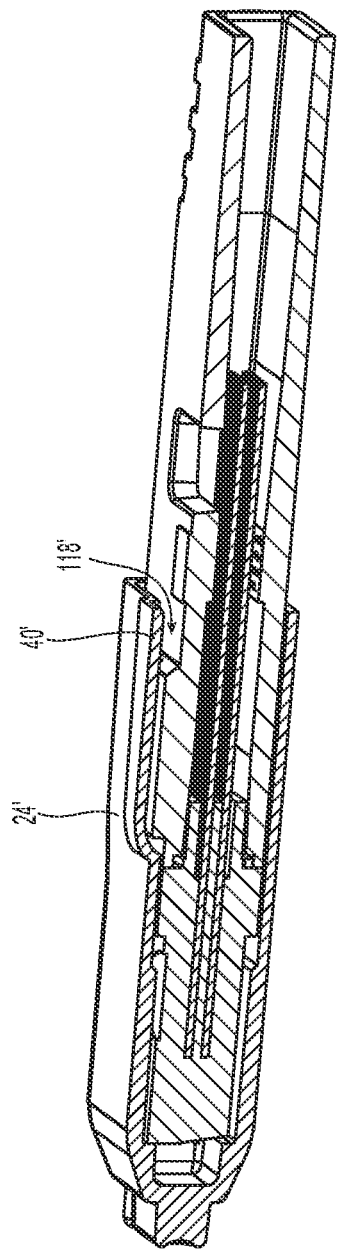
FIG. 10 is a cross section view of a second embodiment of fiber optic assembly according to the present invention.

The lengthwise-extending opening 18 is formed and defined by the top side 24, the opposing bottom side 26, the two side walls 28,30, and by internal surfaces 36 thereof. See FIG. 6. The top side 24 has a receiver 40 to engage a portion of a ferrule push 102. As illustrated in FIGS. 1-2, 4-6, and 8, the receiver 40 is an opening through the top side 24. However, in another embodiment, the receiver 40' may be a depression in the top side 24' from the lengthwise-extending opening 118'. See FIG. 10. The receiver 40 (and 40') has a forward facing surface 42 at a rearward end of the receiver. The forward facing surface 42 partially defines the receiver 40 (window). Likewise, the receiver 40' shown in FIG. 10 has a passageway, instead of a window, that is shaped to accommodate a portion of the ferrule push 102.

Figure 2:
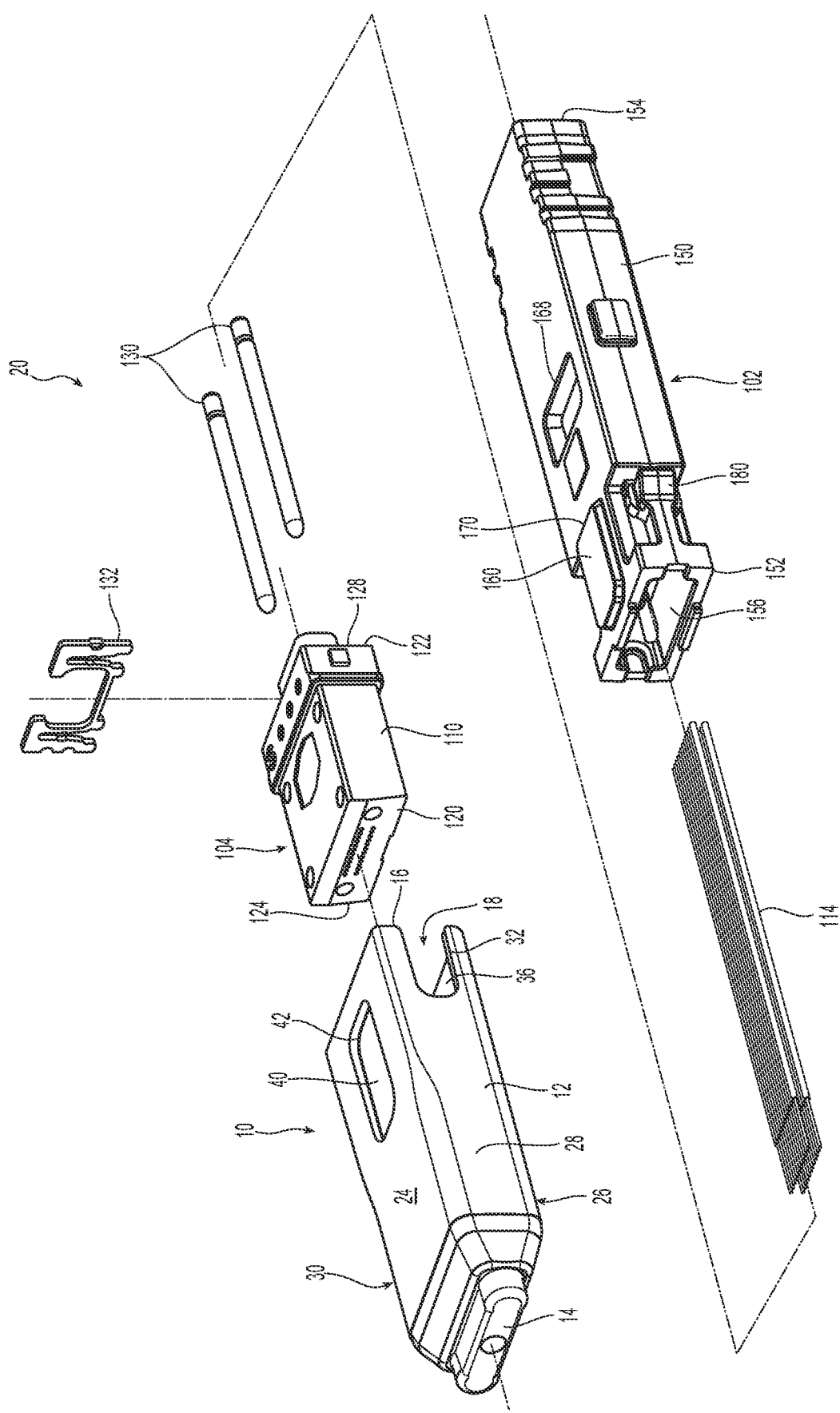
FIG. 2 is an exploded view of the fiber optic assembly in FIG. 1 with a representative fiber optic ferrule, ferrule push, guide pins and optical fibers.
Figure 3:
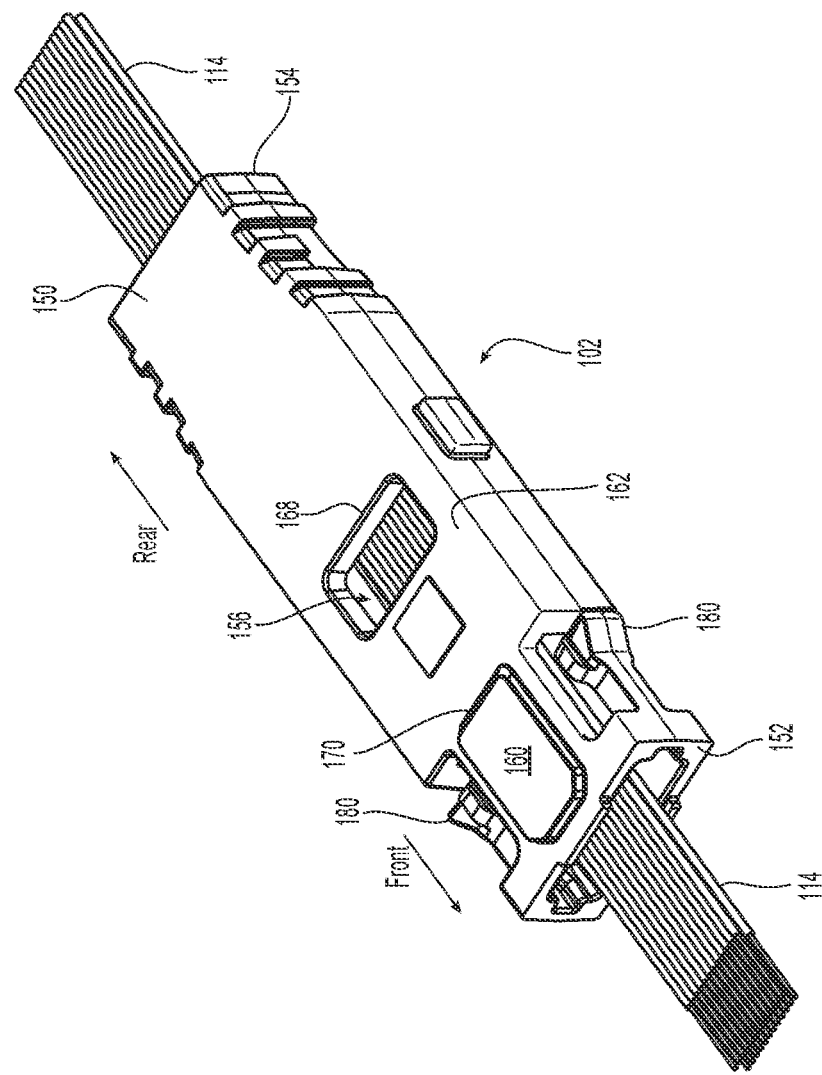
FIG. 3 is an exploded, perspective view of the fiber optic ferrule and ferrule push in FIG. 2.
Figure 3:
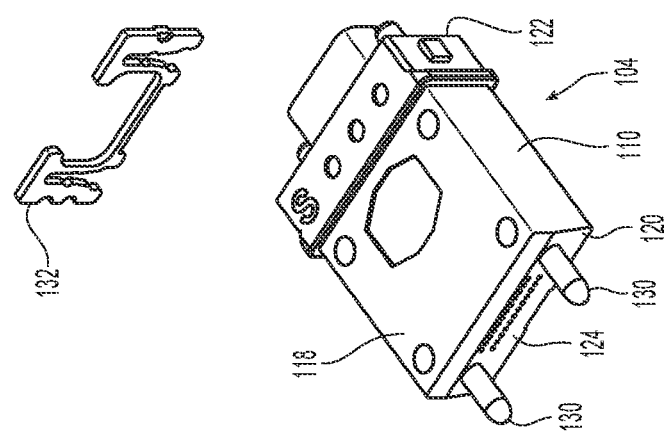
Figure 4:
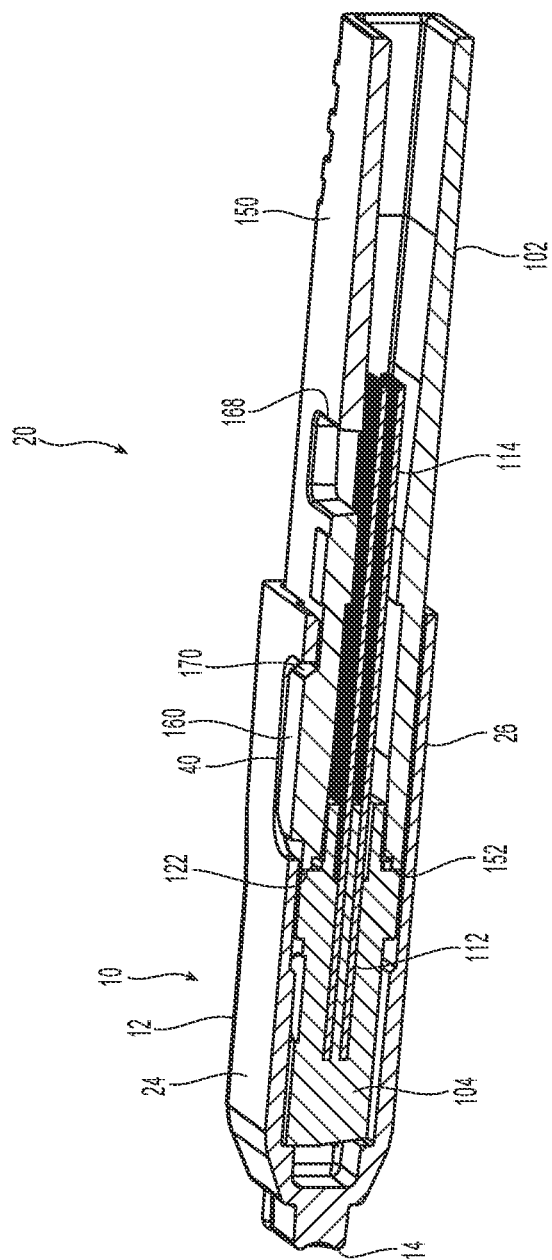
FIG. 4 is a cross section of the fiber optic assembly in FIG. 1.
Figure 6:
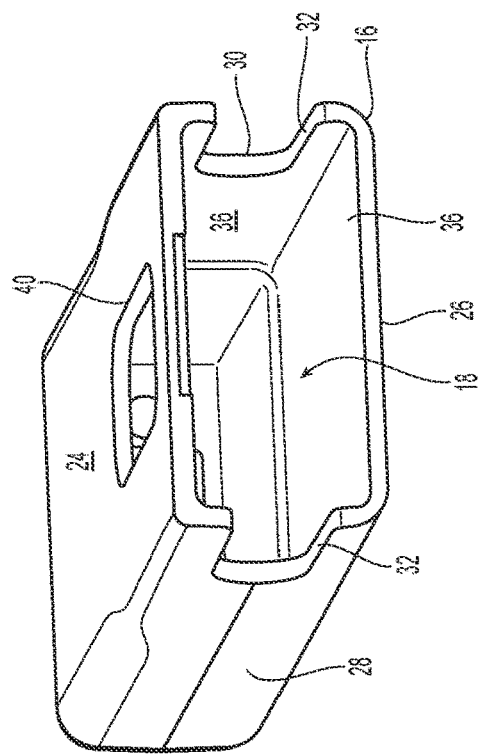
FIG. 6 is a rear left perspective view of the cover in FIG. 1.
Figure 5:
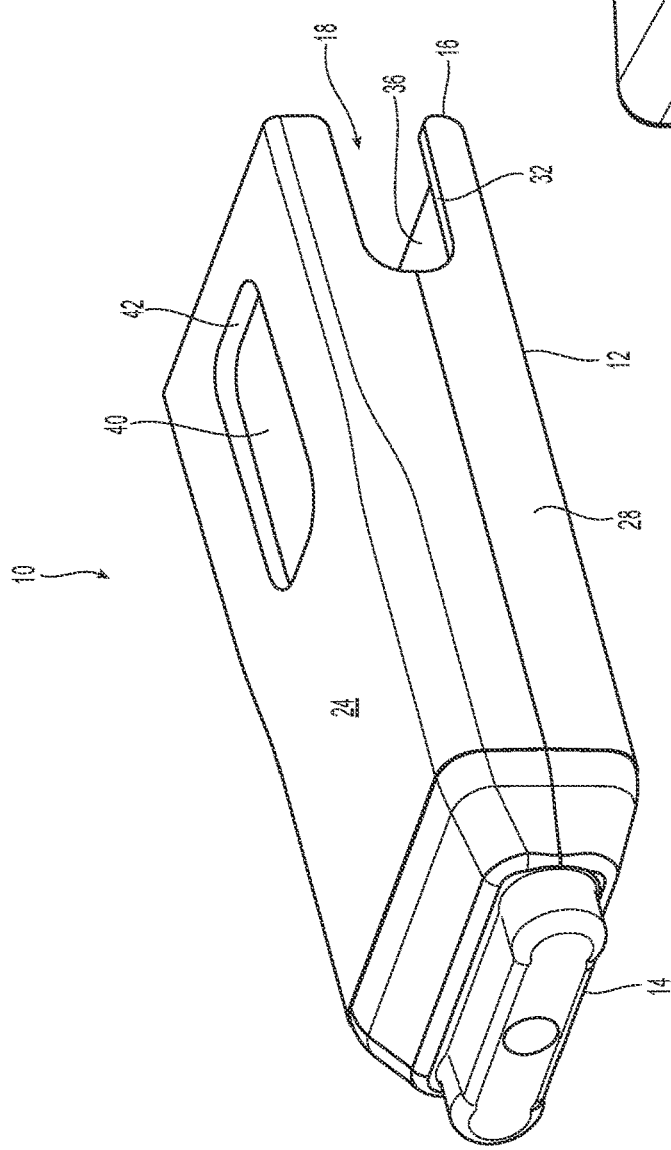
FIG. 5 is a front left perspective view of the cover in FIG. 1.

The fiber optic ferrule 104 may be an MT ferrule, which is generally known in the art. It may also take a number of other configurations, such as illustrated in FIGS. 2 and 3. However, the fiber optic ferrule 104 preferably has a main body 110 that includes a plurality of optical fiber support structures 112 (see also FIG. 4), which may be a plurality of micro-holes, v-grooves, or the like. The optical fiber support structures 112 support and hold the optical fibers 114 inserted into the fiber optic ferrule 104. The main body 110 extends between a front end 120 and a rear end 122, the optical fibers 114 extending from a front face 124 of the front end 120 through a central opening in the main body 110 and exiting out the rear end 122. The rear end 122 of the main body 110 also has a rear face 128. The fiber optic ferrule 104 may also have guide pins 130 (see FIG. 2) and/or a guide pin clamp or spacer 132 disposed at the rear end 122. There may also be more than one central opening through the fiber optic ferrule 104. For example, there may be two or more rows of optical fibers 114, optical fiber support structures 112 in the fiber optic ferrule 104. See FIGS. 2 and 3.

The fiber optic ferrule push 102 also has a main body 150 that extends between a front end 152 and a rear end 154. The main body includes a central opening 156 that extends between the front end 152 and the rear end 154. The central opening 156 also receives the optical fibers 114 that are disposed in the fiber optic ferrule 104. The front end 152 of the main body 150 preferably has the same dimensions of the rear end 122 of the fiber optic ferrule 104. However, those dimensions of the main body 150 may be different from the fiber optic ferrule 104 as well. Since the optical fibers 114 are already in a ribbonized form, a height of the central opening 156 through which the ribbonized optical fibers 114 pass is preferably less than a width of the ribbon (in a transverse direction), at least at the front end 152, and possibly all throughout a length of the fiber optic ferrule push 114. Such a height prevents the fiber optic ferrule push 102 from being rotated relative to the ribbonized optical fibers 114 and fiber optic ferrule 104, for example, when inside a pulling grip, and even afterwards when the fiber optic ferrule 104 engages the fiber optic ferrule push 104. Preferably, the fiber optic ferrule push 102 is generally longer than the fiber optic ferrule 104 (i.e., in a longitudinal direction parallel to the optical fibers 114). Alternatively, the fiber optic ferrule push 102 may be of similar length as the fiber optic ferrule 104. Regardless of the length thereof, the fiber optic ferrule push 102 has substantially the same footprint as the fiber optic ferrule 104. The term "footprint" as used in this disclosure refers to only height, only width, or both height and width of the component in question (e.g., fiber optic ferrule 104 and/or the fiber optic ferrule push 102) when viewed in a cross-sectional plane that is perpendicular to a longitudinal/lengthwise axis of the component. In some embodiments, the fiber optic ferrule push 102 (including a key 160, projection(s) 180, and a rear boss/flange on a side of the fiber optic ferrule push 102) may protrude no further than or only slightly further than the footprint defined by the fiber optic ferrule 104 (specifically a flange/shoulder thereof). The footprint may, for example, be less than 10% larger than that defined by the fiber optic ferrule 104.

The fiber optic ferrule push 102 includes a first alignment structure or projection 160 on a top surface 162 of the main body 150. It may also be referred to as a "key" to one of ordinary skill in the art. The first alignment structure 160 is illustrated as a raised portion in the figures, but also take on other configurations. The key 160 may take any shape or location on the fiber optic ferrule push 102. For example, the key 160 may also be on one of the side surfaces 166, which are on opposing sides of the top surface 162.

There may also be a window 168 extending through the top surface 162 and is in communication with the central opening 156 that forms a passageway for the optical fibers 114. This window 168 allows for access and/or visual inspection by a user to the optical fibers 114.

The fiber optic ferrule push 102 has at least one projection 180 or latch that extends from the main body 150 to engage a corresponding structure 182 in a housing 106 for the fiber optic ferrule 104 and the ferrule push 102. Preferably, there are two such projections 180, but only one may be necessary to retain the fiber optic ferrule push 102 within the housing. As illustrated in figures and perhaps best in FIG. 7, the projections 180 take the form of cantilevered arms, that include a front chamfered surface 184 and a rear facing flat surface 186 to engage the housing.

Figure 7:
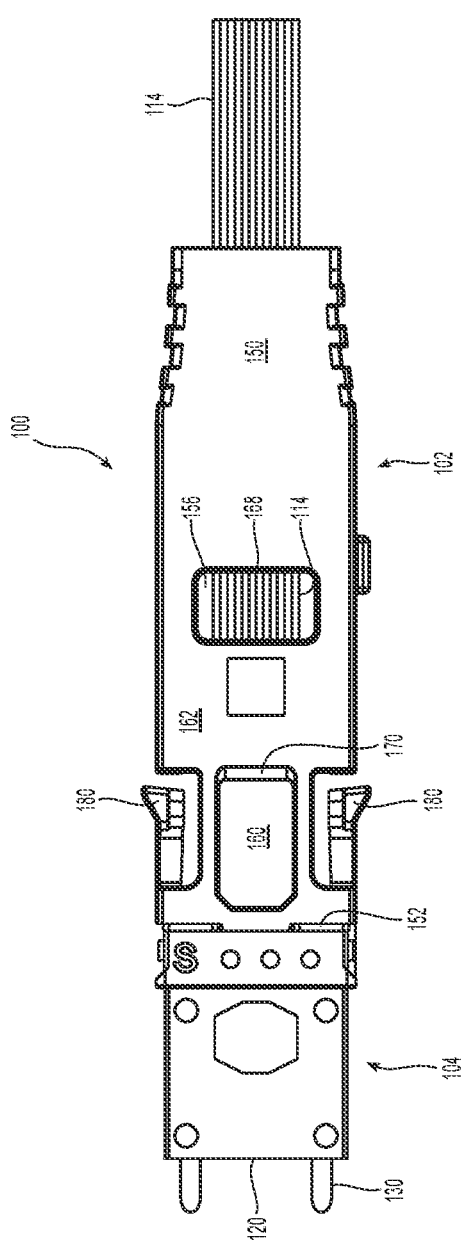
FIG. 7 is a top plan view of the fiber optic ferrule and ferrule push in FIG. 2 in a spatial relationship as occurs in the cover.
Figure 8:
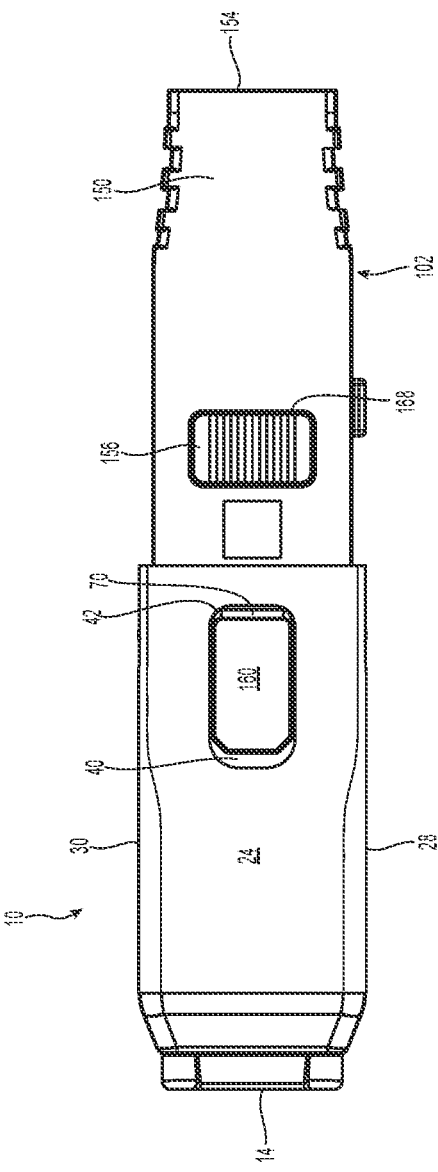
FIG. 8 is a top plan view of the fiber optic assembly in FIG. 1.
Figure 9:
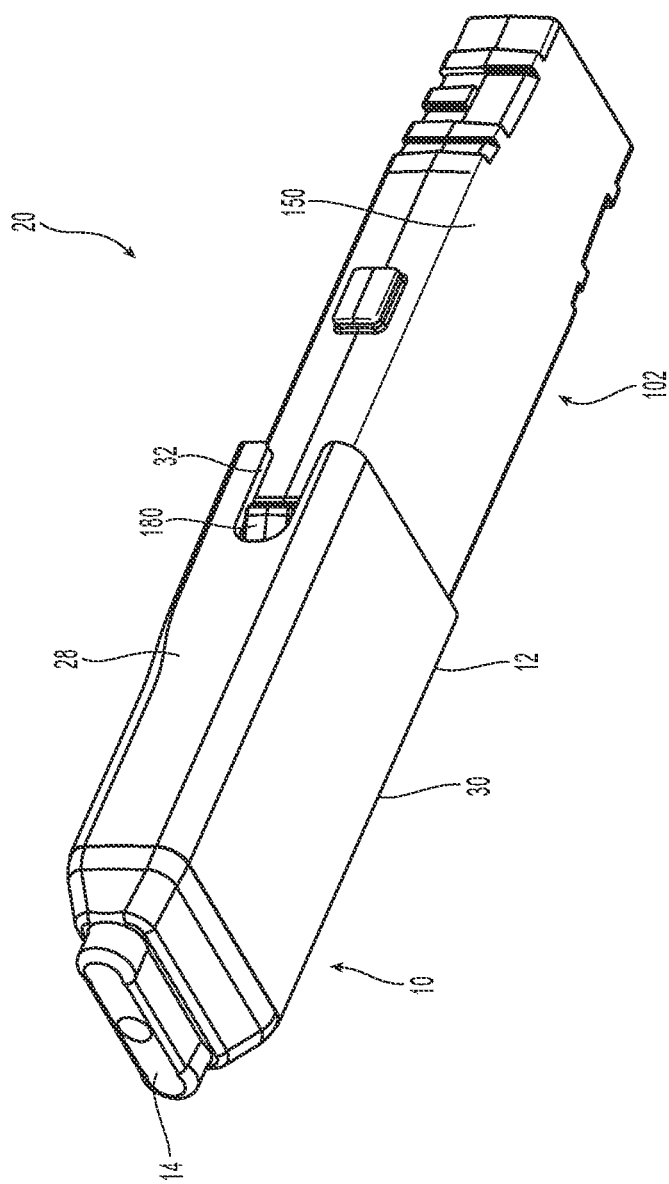
FIG. 9 is bottom left perspective view of the fiber optic assembly in FIG. 1.

As illustrated in FIGS. 2 and 7, the ferrule push 102 has an alignment structure or key 160. The key 160 has a rearward facing surface 170. The cover 10 is made of a material that is somewhat flexible or bendable, at least at the rear end 116. Accordingly, as the ferrule push 102 and the fiber optic ferrule 104 are inserted into the sleeve 12, the key pushes against and bends the top side 24 and its internal surface 36. Once the ferrule push 102 and the fiber optic ferrule 104 are disposed within the lengthwise-extending opening 18, the key 160 will pop up and into the window 40. The engagement of the rearward facing surface 170 with the forward facing surface 42 prevents the ferrule push 102 and the fiber optic ferrule 102 from exiting the cover 10. If the ferrule push 102 is pulled on, those two surfaces will prevent the removal of the ferrule push 102. The cover 10 is also configured so as to keep the ferrule push 102 and the fiber optic ferrule 104 in a constant spatial relationship as illustrated in FIG. 7. That is, the ferrule push 102 will engage the rear end of the fiber optic ferrule 104. As such, when the fiber optic assembly 20 is disposed within the pulling grip, the ferrule push 102 and the fiber optic ferrule 102 will stay connected with one another. Accordingly, the fiber optic ferrule 102 and the ferrule push 104 are held together inside the pulling grip by the cover 10. See, e.g., FIG. 4. While the key 160 plays double duty as a key and as a projection that engages the receiver 40, the key and the projection maybe two different elements and/or structures.

The lengthwise-extending opening 18 may be configured to match the structure of the ferrule push 102 and the fiber optic ferrule 104. The front end 120 of the fiber optic ferrule may engage a corresponding structure in the lengthwise-extending opening 18 to provide a stop point for the ferrule push 102 and the fiber optic ferrule 104. See again, FIG. 4. The cover 10 may also have openings at the front end 14 to receive the guide pins 130. These structures will be positioned within the sleeve so that the key 160 will be disposed within the receiver 40 (or 40') and its rearward facing surface 170 engages the forward facing surface 42. To remove the ferrule push 102 and the fiber optic ferrule 104, a lever or finger can pull up on the top side 24 to allow clearance of the sleeve 12 by the key 160. The cover 10 may then be pulled forward and away from the ferrule push 104 and the fiber optic ferrule 102 outside the pulling sock. Subsequently, the cover 10 may be disposed or reused.

The cutouts 32 each receive one of the projections or latches 180 on the ferrule push 102. The projections 180 extend outward of the sides of the ferrule push 102. The cutouts 32 therefore allow for the sleeve 10 to be as narrow as possible and still not have to worry about the projections 180 engaging the sleeve 10, thereby optimizing the space available inside the pulling sock for several such fiber optic assemblies 20.

Figure 11:
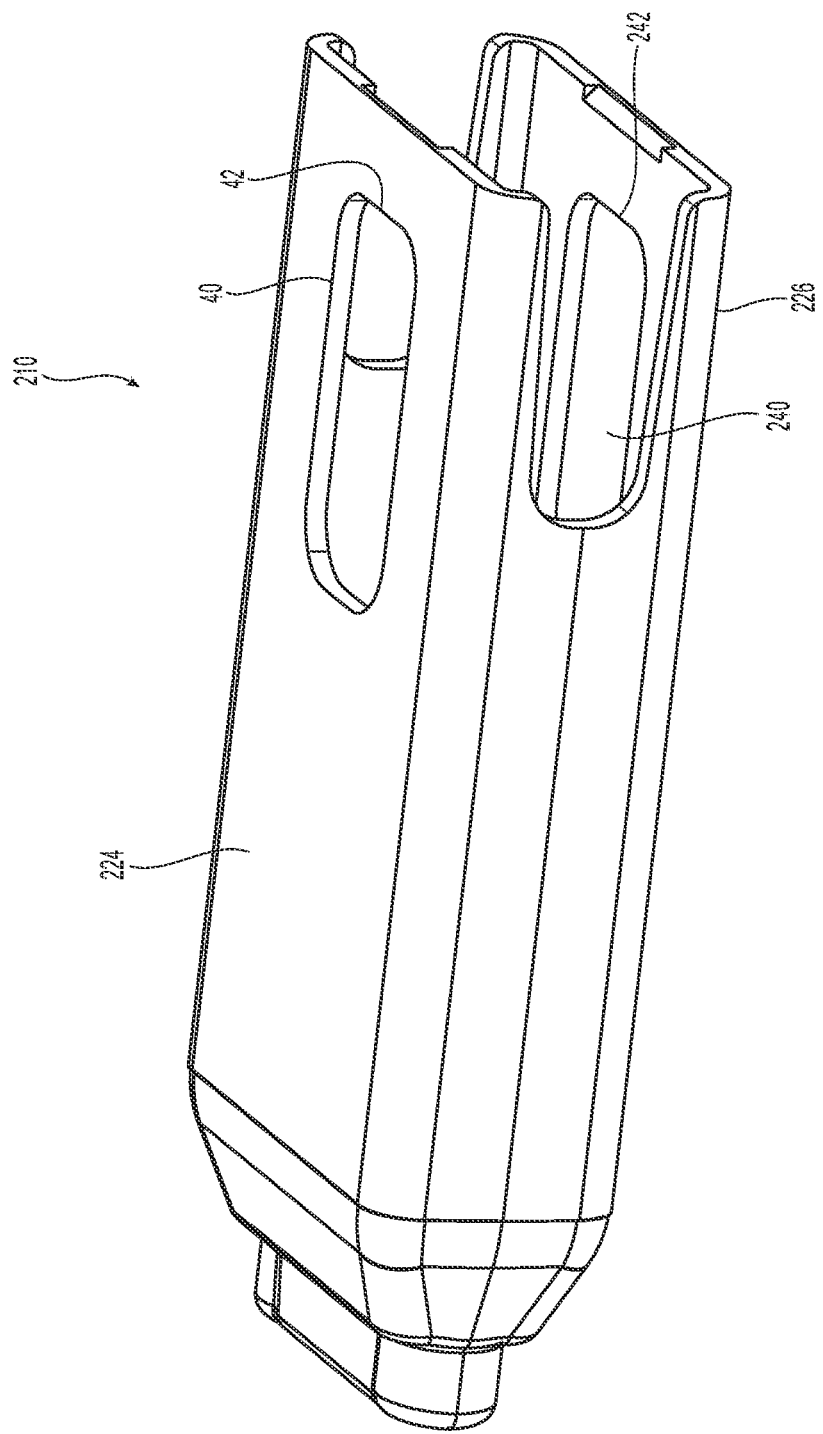
FIG. 11 is a perspective view of another embodiment of a cover for a fiber optic ferrule and ferrule push according to the present invention.

FIG. 11 illustrates another embodiment of a cover 210 for a fiber optic ferrule and ferrule push according to the present invention. The cover 210 is similar to the cover 10 and has the same general configuration and elements. One of the differences in cover 210 is that there are two receivers 40 and 240 to engage a portion of a ferrule push 102, rather than just the one receiver 40 in the top side 224. As illustrated in FIG. 11, there is a receiver 40 in the top side 224 and a second receiver 240 in the opposing bottom side 226. As explained above, the two receivers 40 and 240 may be a depression in the top side from the lengthwise-extending opening.

Each of the receivers 40, 240 has a forward facing surface, elements 42 and 242, respectively, at a rearward end of the receiver. The forward facing surfaces 42,242 partially define the receivers 40,240.

Figure 13:
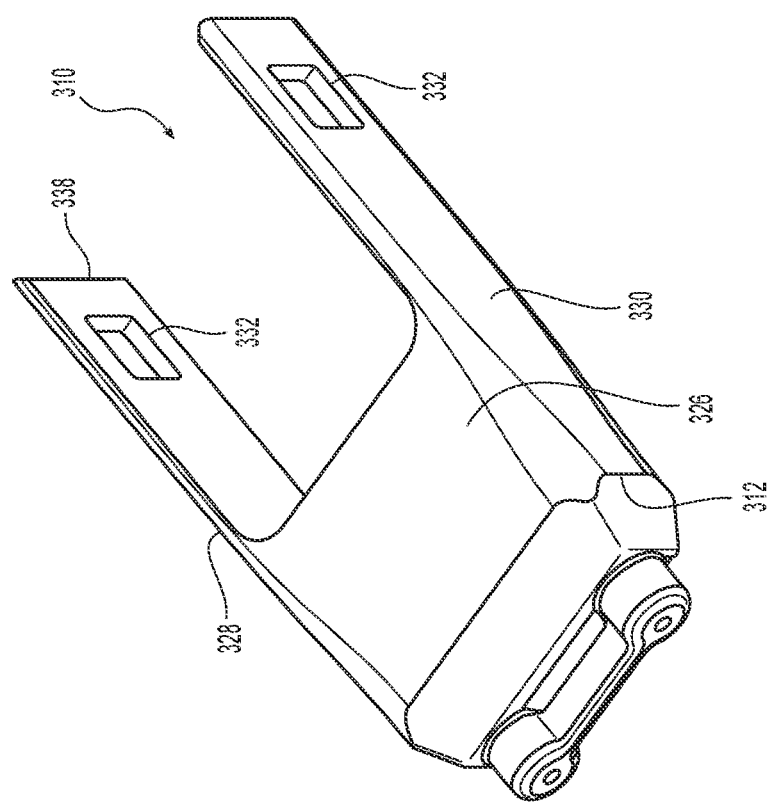
FIG. 13 is a top perspective view of the cover in FIG. 12.
Figure 12:
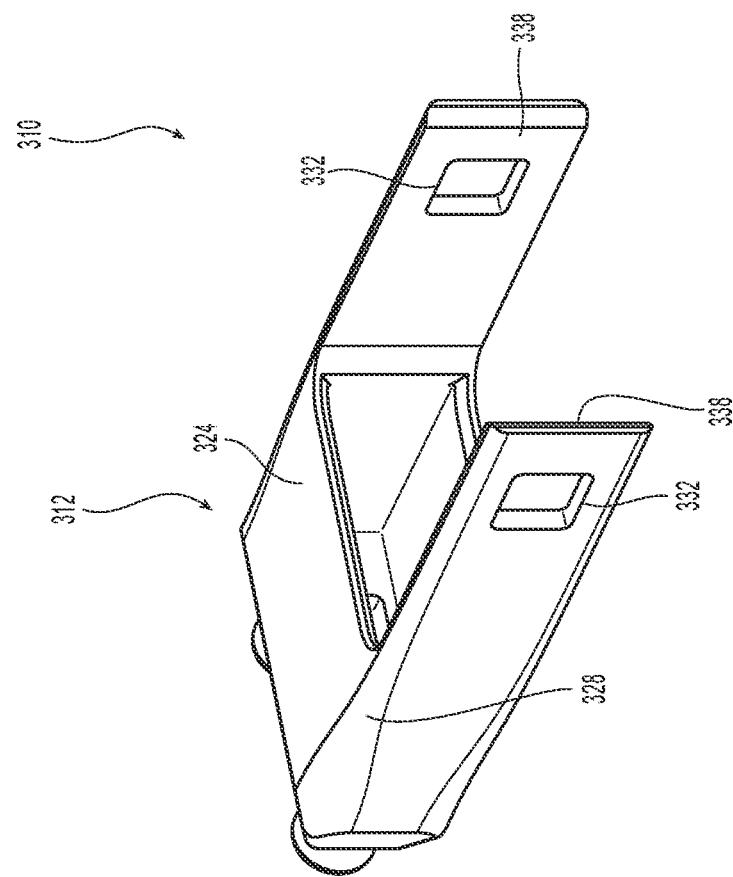
FIG. 12 is a perspective view of yet another embodiment of a cover for a fiber optic ferrule and ferrule push according to the present invention

FIGS. 12 and 13 illustrate yet another embodiment of a cover 310 for a fiber optic ferrule 104 and ferrule push 102 according to the present invention. In this embodiment, the cover 310 has a top side 324 and an opposing bottom side 326. In this embodiment, the top side 324 and the bottom side 326 do not extend as far rearwardly as they do in the previous embodiments. Indeed, the top side 324 and the bottom side 326 stop prior to where the receivers were in those prior embodiments. In fact, there are no receivers in this embodiment, but rather cutouts as discussed below. The two side walls 328,330 extend between the top side 324 and the opposing bottom side 326 and rearwardly along at least a portion of the sleeve 312 and farther rearwardly than the top side 324 and the bottom side 326. As illustrated, there is a cutout 332 in each of the two side walls 328, 330, the cutouts 332 preferably take the form of a hole or opening that has a rearward portion 338 to enclose the cutouts 332. The cutouts are to receive the projection 180 or latch that extends from the main body 150 of the ferrule push 102. In this case, it is the projection 180 engaging the cutout 332 that retains the fiber optic ferrule push 102 and the fiber optic ferrule 104 in the cover 310.

Figure 15:
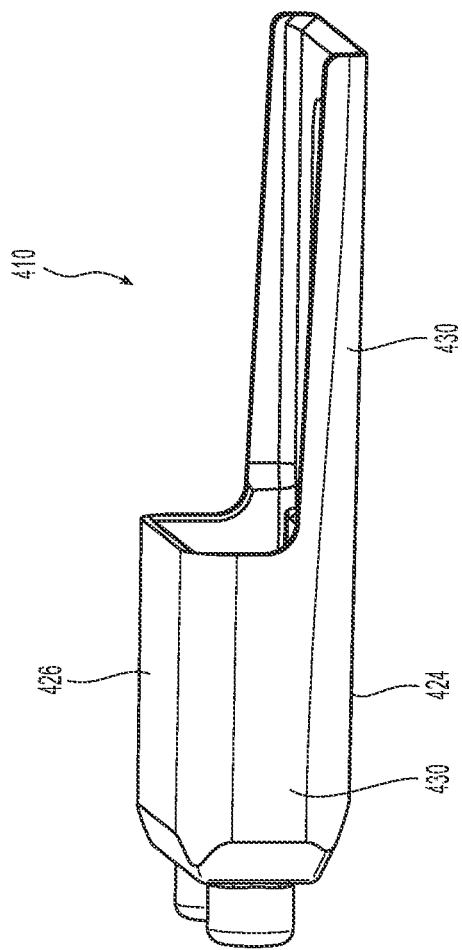
FIG. 15 is a side elevation view of the cover in FIG. 14.
Figure 14:
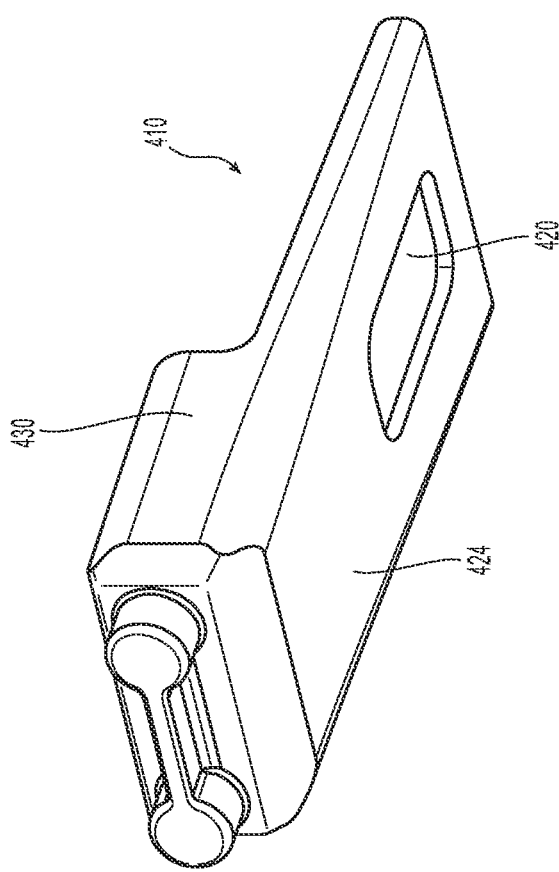
FIG. 14 is a perspective view of another embodiment of a cover for a fiber optic ferrule and ferrule push according to the present invention.
Figure 16:
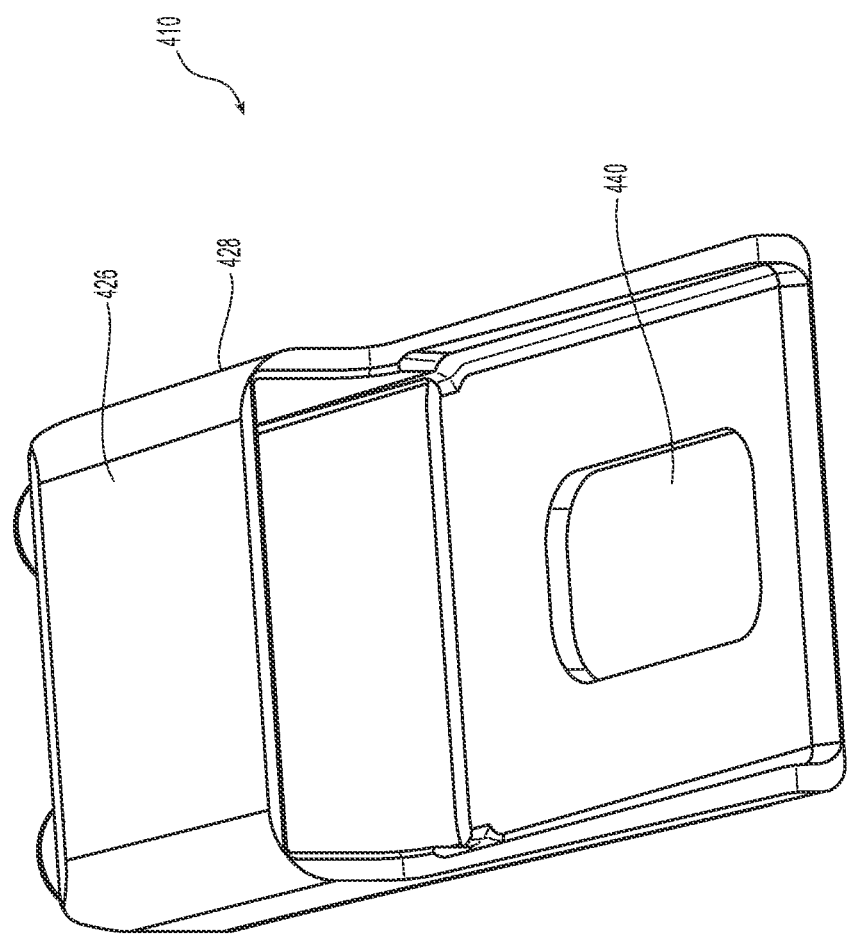
FIG. 16 is a bottom view of the cover in FIG. 14.

FIGS. 14-16 illustrate another embodiment of a cover 410 for a fiber optic ferrule 104 and ferrule push 102 according to the present invention. In this embodiment, the cover 410 has a top side 424 and a shortened opposing bottom side 426. In this embodiment, the bottom side 426 does not extend as far rearwardly as does the top side 424 or as it does in the previous embodiments (except for cover 310). The bottom side 426 does extend far enough to prevent the end face of the fiber optic ferrule 104 from becoming contaminated, however. The two side walls 428,430 extend between the top side 424 and a least a portion of the bottom side 426, but then the height of the side walls decreases the farther to rear of the cover 410. The top side 424 does have a receiver 440, which is illustrated as an opening through the top side 424, or alternatively it may also be a depression such as receiver 40'.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

We claim:

1. A fiber optic assembly comprising:
a ferrule push;
a fiber optic ferrule positioned forward of the ferrule push having a plurality of optical fibers supported by the fiber optic ferrule; and
a cover coupled to the fiber optic ferrule and the ferrule push and including a sleeve extending lengthwise between opposed front and rear ends, the sleeve defining a lengthwise-extending opening that opens through the rear end for receiving at least a portion of the fiber optic ferrule and the ferrule push, the sleeve having a top side and an opposing bottom side, and two side walls extending between the top side and the bottom side and along at least a portion of the sleeve,
wherein the fiber optic ferrule and the ferrule push are held together by the cover and the sleeve has a receptacle for guide pins disposed within the fiber optic ferrule.

2. The fiber optic assembly according to claim 1, wherein the cover is removably coupled to the fiber optic ferrule and the ferrule push.

3. The fiber optic assembly according to claim 1, wherein the cover further comprises a receiver in the top side to receive a projection from the ferrule push.

4. The fiber optic assembly according to claim 3, wherein the receiver is engaged with a key of the ferrule push.

5. The fiber optic assembly according to claim 3, wherein the receiver is a depression in a top surface within the lengthwise-extending opening.

6. The fiber optic assembly according to claim 3, wherein the receiver is a window extending through the top side.

7. The fiber optic assembly according to claim 1, wherein the cover has a footprint that is substantially same as that of the ferrule push.

8. The fiber optic assembly according to claim 1, wherein the cover has a front end and the front end of the cover is fully enclosed.

9. A fiber optic assembly comprising:
a ferrule push;
a fiber optic ferrule positioned forward of the ferrule push within a pulling grip having a plurality of optical fibers supported by the fiber optic ferrule; and
a cover coupled to the fiber optic ferrule and the ferrule push and including a sleeve extending lengthwise between opposed front and rear ends, the sleeve defining a lengthwise-extending opening that opens through the rear end for receiving at least a portion of the fiber optic ferrule and the ferrule push, the sleeve having a top side and an opposing bottom side, and two side walls extending between the top side and the bottom side and along at least a portion of the sleeve,
wherein the fiber optic ferrule and the ferrule push are held together by the cover and the sleeve has a receptacle for guide pins disposed within the fiber optic ferrule.

10. The fiber optic assembly according to claim 9, wherein the cover has a front end and the front end of the cover is fully enclosed.

* * * * *